Patented May 1, 1928.

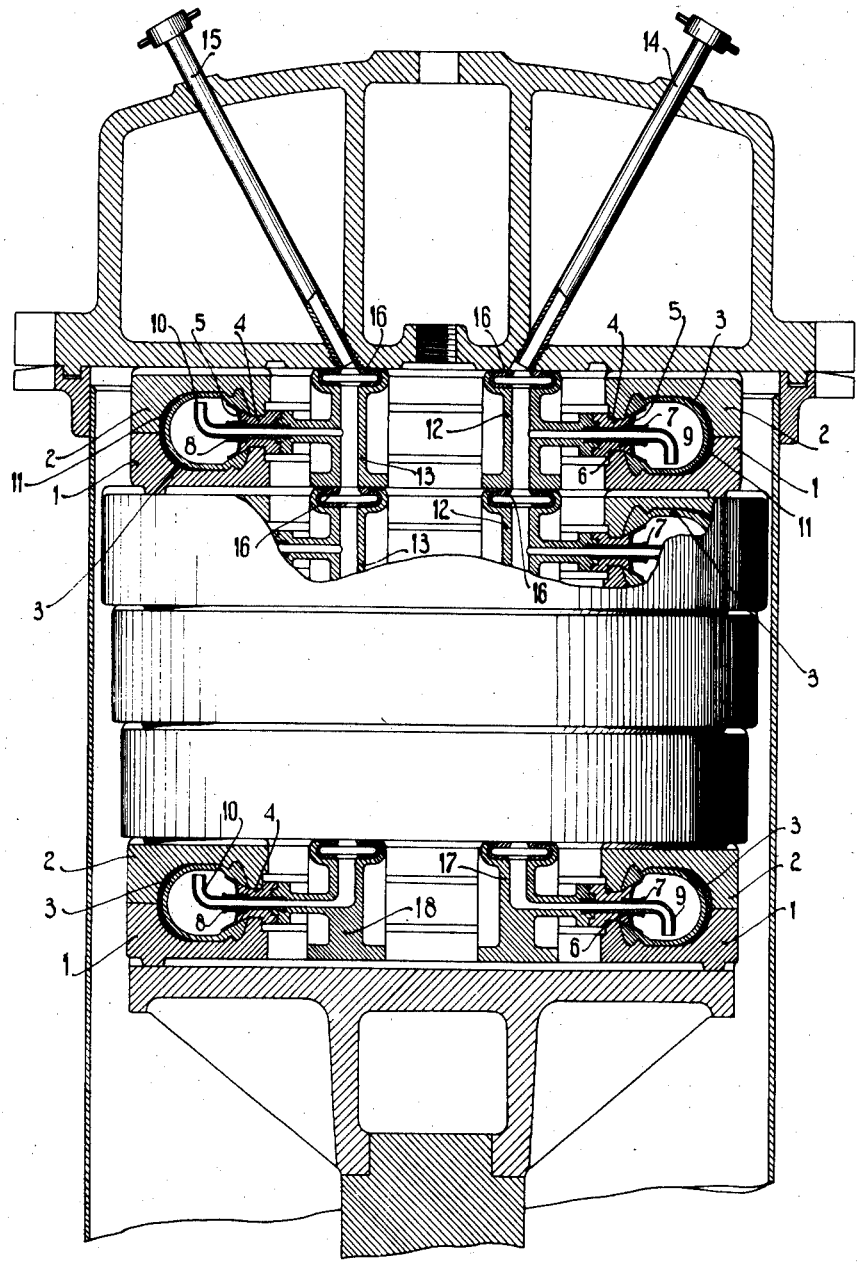

1,668,032

UNITED STATES PATENT OFFICE.

DIRK FRANS WILHELMI, OF DOORWERTH, NETHERLANDS, ASSIGNOR, BY DIRECT AND MESNE ASSIGNMENTS, OF ONE-HALF TO MORGAN & WRIGHT, OF DETROIT, MICHIGAN, A CORPORATION OF MICHIGAN, AND ONE-HALF TO THE B. F. GOODRICH COMPANY, OF NEW YORK, N. Y., A CORPORATION OF NEW YORK.

METHOD OF VULCANIZING THE PROTECTIVE COVER OR TREAD PART ONTO THE CARCASS OF A TIRE AND APPARATUS THEREFOR.

Application filed September 20, 1921, Serial No. 502,002, and in the Netherlands November 11, 1920.

For vulcanizing the protective cover or tread part onto the prevulcanized carcass or casing of a tire for motor cars said parts are sometimes firmly wrapped up in order that the required pressure may be obtained, but ordinarily they are treated in a mould wherein the carcass is pressed against the tread part by air pressure in an inner tube. The first named method is unsatisfactory owing to the poor appearance of the tire so produced and to the comparatively low pressure under which the vulcanization is carried out. The second method has the inconvenience that the inner tube is liable to overvulcanization and cannot, therefore, be used more than say fifteen times.

It has further been suggested to supply water pressure to the interior of the carcass during the vulcanization in order to expand or stretch the carcass into contact with the inner surfaces of the mould, the pressure water being in direct contact with and consequently having the same pressure and substantially the same temperature as the steam used for heating the mould.

Now, according to my present invention, the pressure of the water supplied to the interior of the carcass is independent of the steam pressure so that it may be raised to any suitable amount in excess of the steam pressure, whereby a much better quality of the tire is ensured. I further prefer to allow the pressure water to circulate through the tire during the vulcanization whereby the carcass is kept at a lower temperature than the mould and overvulcanization of the carcass and of the packing rings is prevented. I may control the temperature of the pressure water flowing through the tire by regulating the speed of flow, and for this purpose the water is preferably supplied by a high pressure rotary pump.

Another object of my invention is an improved apparatus for carrying my new method into effect. The characteristic features of this apparatus will be brought out in the claims.

In order that my invention may be clearly understood, I shall now proceed to describe a practical embodiment, reference being made to the annexed drawing which shows an elevation, partly in section, of a container with five vulcanizing moulds adapted to be externally heated by steam admitted into said container. From this drawing it follows that a plurality of moulds for vulcanizing tires of different diameters may be simultaneously treated in a common container.

Each mould is composed of an annular lower shell 1 and an annular upper shell 2. The carcass of the tire 3 is placed around a metal ring 4 provided with a packing sleeve 5 secured to it by means of a dove tailed ridge 6. Said packing sleeve is provided with tubulures 7 and 8 forming tight joints with a water inlet pipe 9 and a water outlet pipe 10, respectively, passed therethrough and through ring 4.

The ring 4, the sleeve 5, the carcass 3 and the protective cover or tread part 11 are placed in the lower shell 1 whereupon the upper shell 2 is closed down on the lower shell.

Secured to ring 4 are two T's 12 and 13 in communication with the water supply pipe 14 and the water discharge pipe 15, respectively. Annular packing sleeves 16 are provided to make fluid tight joints between the T's of the successive moulds placed the one on the other and between the T's of the top mould and the pipes 14, 15. The T's 17, 18 of the lower mould have blind bottoms.

That end of the inlet pipe 9 which projects into the tire is bent downwards in order that the water may be drawn from the tire or forced out by compressed air admitted through pipe 15 when the vulcanization is finished. The end of the outlet pipe 10 is bent upwards as shown so as to allow the air to escape through pipe 15 when water is admitted into the tire.

Having now particularly described and ascertained the nature of my present invention and in what manner the same is to be performed, I declare that what I claim is:—

1. A vulcanizing apparatus comprising a container adapted to receive steam under pressure, a vulcanizing mold arranged in said container, a liquid inlet pipe extending from the exterior of the container into said mold, and a liquid outlet pipe extending from the exterior of said container to said mold, the interior of said mold and said pipes permitting the circulation of liquid through the mold independently of the steam in said container.

2. A vulcanizing apparatus including a container, a series of molds arranged therein, a ring arranged in each mold for clamping a tire carcass against the walls of the molds, an inlet T and an outlet T connected to each ring, aligned conduits through the inlet T for placing the interiors of the molds in communication, aligned conduits through the outlet T's, a liquid inlet pipe extending from the exterior of the container to one of said inlet T's, and a liquid outlet pipe extending from the exterior of the container to one of said outlet T's.

3. A vulcanizing apparatus comprising a container adapted to receive steam, a series of molds superposed in said container, a ring for each mold adapted to clamp a tire carcass within the mold, a hollow inlet T and a hollow outlet T connected to each ring, for admitting and discharging fluid to and from the interior of a carcass arranged within the mold, fluid conducting means arranged between the T's, a fluid inlet pipe extending from the interior of the container to one of said inlet T's, and a fluid outlet pipe extending from the exterior of the container to one of the outlet T's.

4. An apparatus including press members for subjecting molds to treatment, in combination with means for supplying fluid to the interior of the molds, said means including a header composed of sections with ends adapted to make tight connection with each other by pressure of the press members, and branch passage connections between the sections of the header and the molds.

5. A method of vulcanizing a plurality of tire casings which consists in enclosing the tire casings within molds, locating the molds within a container adapted to be supplied with a heating medium, simultaneously supplying the liquid under pressure to the interior of each of the tire casings from a source outside of the container, and simultaneously withdrawing said liquid under pressure from each of the tire casings to a point outside of the container, whereby the tire casings may be vulcanized under identical conditions and without intermingling the liquid under pressure with the heating medium in contact with the exterior of the molds.

6. Vulcanizing apparatus comprising a plurality of molds, means associated with each of said molds for conducting pressure fluid into a hollow article contained therein, each said mold and said means being adapted to be handled as a unit, a coupling member constituting a part of each of said means, the several said coupling members being adapted to be connected with each other to form a trunk conduit by the act of assembling the molds with each other, means for applying fluid pressure to said trunk conduit, and means for heating the articles within said mold.

In testimony whereof I affix my signature.

DIRK FRANS WILHELMI.